United States Patent
Ikegami et al.

(10) Patent No.: US 7,598,332 B2
(45) Date of Patent: Oct. 6, 2009

(54) POLYMERIZABLE COMPOUND, POLYMER COMPOUND, COMPOSITION USING THE SAME, IMAGE-FORMING METHOD, AND IMAGE-FORMING APPARATUS

(75) Inventors: Masayuki Ikegami, Atsugi (JP); Koichi Sato, Atsugi (JP); Ikuo Nakazawa, Zama (JP); Sakae Suda, Sagamihara (JP); Keiichiro Tsubaki, Atsugi (JP); Ryuji Higashi, Atsugi (JP); Keiko Yamagishi, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 619 days.

(21) Appl. No.: 10/554,589

(22) PCT Filed: Apr. 30, 2004

(86) PCT No.: PCT/JP2004/006341

§ 371 (c)(1), (2), (4) Date: Oct. 26, 2005

(87) PCT Pub. No.: WO2004/099270

PCT Pub. Date: Nov. 18, 2004

(65) Prior Publication Data

US 2006/0235177 A1 Oct. 19, 2006

(30) Foreign Application Priority Data

| May 8, 2003 | (JP) | ............... 2003-129998 |
| Sep. 22, 2003 | (JP) | ............... 2003-329832 |
| Apr. 26, 2004 | (JP) | ............... 2004-130296 |

(51) Int. Cl.
*C08F 22/14* (2006.01)
*C08F 212/00* (2006.01)
*C08F 216/12* (2006.01)
*C08F 228/02* (2006.01)

(52) U.S. Cl. ............ 526/323; 526/287; 526/317.1; 526/333; 526/334; 526/319; 524/505; 524/556; 524/612; 523/160; 523/161

(58) Field of Classification Search .......... 526/287, 526/320, 333, 334, 317.1, 319, 323; 524/505, 524/612, 554; 523/160, 161
See application file for complete search history.

(56) References Cited

U.S. PATENT DOCUMENTS

| 4,313,124 A | 1/1982 | Hara ............... 346/140 R |
| 4,345,262 A | 8/1982 | Shirato et al. ......... 346/140 R |
| 4,459,600 A | 7/1984 | Sato et al. ............ 346/140 R |
| 4,463,359 A | 7/1984 | Ayata et al. ............ 346/1.1 |
| 4,558,333 A | 12/1985 | Sugitani et al. ........ 346/140 R |
| 4,723,129 A | 2/1988 | Endo et al. ............ 346/1.1 |
| 4,740,796 A | 4/1988 | Endo et al. ............ 346/1.1 |
| 4,957,988 A * | 9/1990 | Irving et al. ............. 526/259 |
| 5,085,698 A * | 2/1992 | Ma et al. ............... 524/388 |
| 5,698,512 A * | 12/1997 | Austin et al. ............ 510/475 |
| 7,004,579 B2 | 2/2006 | Sato et al. ............. 347/105 |
| 7,056,972 B2 | 6/2006 | Nakazawa et al. ...... 524/505 |
| 7,067,590 B2 | 6/2006 | Sato et al. ............. 525/299 |
| 7,157,539 B2 * | 1/2007 | Sato et al. ............. 526/334 |
| 2005/0033010 A1 | 2/2005 | Sato et al. ............. 528/80 |
| 2005/0131102 A1 | 6/2005 | Nakazawa et al. ...... 523/160 |
| 2005/0140762 A1 | 6/2005 | Sato et al. ............. 347/100 |
| 2005/0197424 A1 | 9/2005 | Hugashi et al. .......... 523/22 R |
| 2005/0209367 A1 | 9/2005 | Sato et al. ............. 523/161 |
| 2005/0219277 A1 | 10/2005 | Sato et al. ............. 347/1 |
| 2005/0239918 A1 | 10/2005 | Nakazawa et al. ...... 523/160 |
| 2005/0249925 A1 | 11/2005 | Ikegami et al. .......... 428/195.1 |
| 2006/0004124 A1 | 1/2006 | Tsubaki et al. .......... 523/160 |
| 2006/0047015 A1 | 3/2006 | Duda et al. ............ 523/160 |
| 2006/0050117 A1 | 3/2006 | Sato et al. ............. 347/100 |

(Continued)

FOREIGN PATENT DOCUMENTS

EP 0 271 784 6/1988

(Continued)

OTHER PUBLICATIONS

Takeuchi, et al., "Living Cationic Polymerization of Ethyl 2-(Vinyloxy)ethoxyacetate: A Vinyl Ether With An Ether and an Ester Function in the Pendant", Journal of Polymer Science: Part A: Polymer Chemistry, vol. 27, No. 10 (Sep. 1989), pp. 3303-3314.

*Primary Examiner*—David Wu
*Assistant Examiner*—Michael M Bernshteyn
(74) *Attorney, Agent, or Firm*—Fitzpatrick, Cella, Harper & Scinto (57) ABSTRACT

There is provided a polymer compound including a repetitive unit structure represented by the following general formula (2): General formula (2): (where X' represents a polyalkenyl group; A represents a linear or branched alkylene group having a carbon atom number of 1 to 15, which may be substituted; m represents an integer of 0 to 30; B represents a single bond or an alkylene group which may be substituted; D represents an aromatic ring structure which may be substituted; n represents an integer of 0 to 10; and R represents a hydrogen atom, an alkyl group which may be substituted, or an aromatic ring structure which may be substituted). The polymer compound is suitable for improving dispersibility of a coloring material or solid material in an ink composition or toner composition.

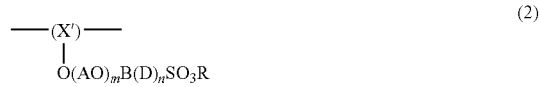

6 Claims, 2 Drawing Sheets

U.S. PATENT DOCUMENTS

| | | | |
|---|---|---|---|
| 2006/0057485 A1 | 3/2006 | Teshima et al. | 430/108.8 |
| 2006/0100310 A1 | 5/2006 | Nakazawa et al. | 523/160 |
| 2006/0128828 A1 | 6/2006 | Sato et al. | 523/160 |
| 2006/0144287 A1 | 7/2006 | Tsubaki et al. | 106/31.13 |
| 2006/0146087 A1 | 7/2006 | Sato et al. | 347/21 |
| 2006/0148997 A1 | 7/2006 | Sato et al. | 525/299 |
| 2006/0160975 A1 | 7/2006 | Suda et al. | 526/330 |
| 2006/0178468 A1 | 8/2006 | Sato et al. | 524/556 |
| 2006/0221117 A1 | 10/2006 | Sato et al. | 347/21 |
| 2006/0235177 A1 | 10/2006 | Ikegami et al. | 526/287 |
| 2006/0250463 A1 | 11/2006 | Nakazawa et al. | 347/100 |

FOREIGN PATENT DOCUMENTS

| | | |
|---|---|---|
| EP | 271784 A2 * | 6/1988 |
| EP | 1357138 A1 * | 10/2003 |
| JP | 59-123670 | 7/1984 |
| JP | 59-138461 | 8/1984 |

* cited by examiner

POLYMERIZABLE COMPOUND, POLYMER COMPOUND, COMPOSITION USING THE SAME, IMAGE-FORMING METHOD, AND IMAGE-FORMING APPARATUS

TECHNICAL FIELD

The present invention relates to novel polymerizable compounds, polymer compounds, and compositions using them, which are useful as various functional materials, and to an image-forming method and an image-forming apparatus, and more particularly, to ink compositions and toner compositions, which use these compounds together with solvents or dispersing media and coloring materials, and various kinds of image-forming methods and image-forming apparatuses, which use these compositions.

BACKGROUND ART

Above all, inkjet technology has remarkable features of compactness and low power consumption as a direct recording method. In addition, enhancement of image quality has been rapidly advanced by miniaturization of nozzles, and so on. An example of the inkjet technology is a method of forming an image on a recording medium by heating ink supplied from an ink tank by heaters in nozzles so as to be evaporated and to form bubbles therein to discharge ink therefrom. As another example, there is a method of discharging ink from nozzles by vibrating piezoelectric elements. In addition, in these methods, improvements have been desired in terms of bleeding and feathering. For the improvements thereof, U.S. Pat. No. 5,085,698 discloses the use of pigment-dispersed ink.

Furthermore, for manufacturing ink compositions and toner compositions, in many conventional cases, coloring materials have been dispersed in solutions in which binder resins are dissolved. As the binder resins generally used for a wet dispersion of pigments, for example, styryl, acryl, and methacryl polymer compounds have been used. However, for preparing pigment ink in which a solvent, particularly water, is used as a base material, it is preferable to use a polymer material having an ionic functional group.

On the other hand, a polymer compound having a polyalkenyl ether main chain is also known as a polymer material having a flexible polymer chain, an ionic functional group has been hardly introduced in the repeating unit of a polymer compound. Barely, carboxylic acids and esters thereof are described as possible materials in "Journal of Polymer Science Part A Polymer Chemistry" vol. 27; pp. 3303-3314, 1989, and in the present circumstances, more stable polymer compounds have been desired.

DISCLOSURE OF THE INVENTION

The present invention has been made in consideration of the above circumstances and provides a polymer compound suitable for improving the dispersibility of a coloring material or solid material in the ink composition or toner composition.

In addition, the present invention provides a novel polymerizable compound which is stable and necessary in manufacture of the above polymer compound.

In addition, the present invention provides a liquid composition using the above polymer compound, an image-forming method using a recording material such as a toner composition, and a liquid-providing method and apparatus.

The inventors of the present invention have made extensive studies on the prior art and problems, and reached to complete the present invention represented by the following description.

The present invention relates to a polymerizable compound represented by the following general formula (1):

General Formula (1):

The present invention relates to a polymerizable compound represented by the following General formula (1):

$$XO(AO)_mB(D)_nSO_3R \qquad \text{General formula (1):}$$

(wherein X represents an alkenyl group; A represents a linear or branched alkylene group having a carbon atom number of 1 to 15, which may be substituted; m represents an integer of 0 to 30, if m is a plural number, each A may be different; B represents a single bond or an alkylene group which may be substituted; D represents an aromatic ring structure which may be substituted; n represents an integer of 0 to 10, if n is a plural number, each D may be different; and R represents a hydrogen atom, an alkyl group which may be substituted, or an aromatic ring structure which may be substituted).

Further, the present invention relates to a polymer compound including a repetitive unit structure represented by the following general formula (2) or (3):

General formula (2):

(wherein X' represents a polyalkenyl group; A represents a linear or branched alkylene group having a carbon atom number of 1 to 15, which may be substituted; m represents an integer of 0 to 30, if m is a plural number, each A may be different; B represents a single bond or an alkylene group which may be substituted; D represents an aromatic ring structure which may be substituted; n represents an integer of 0 to 10, if n is a plural number, each D may be different; and R represents a hydrogen atom, an alkyl group which may be substituted, or an aromatic ring structure which may be substituted); and General formula (3):

(wherein X' represents a polyalkenyl group; A represents a linear or branched alkylene group having a carbon atom number of 1 to 15, which may be substituted; m represents an integer of 0 to 30, if m is a plural number, each A may be different; B represents a single bond or an alkylene group which may be substituted; D represents an aromatic ring structure which may be substituted; n represents an integer of 0 to 10, if n is a plural number, each D may be different; and M represents a monovalent or polyvalent metal cation).

Further, the present invention relates to a block polymer including one selected from sulfonic acid, sulfonic acid ester, and sulfonate in a side chain of at least one block segment, and a repetitive unit constructed of an alkenyl ether structure. Preferably, the present invention relates to a block polymer in which the repetitive unit structure is a repetitive unit structure represented by the general formula (2) or (3).

Further, the present invention relates to a composition including: the polymer compound or block polymer according to the present invention; a solvent or a dispersing medium; and a functional substance.

Further, the present invention relates to a recording material in which the functional substance is a coloring material.

Further, the present invention relates to an image-forming method including the steps of: preparing the recording material according to the present invention; and recording the recording material on a medium.

Further, the present invention relates to an image-forming apparatus including recording means for recording the recording material according to the present invention on a medium.

A polymer compound suitable for preferably adjusting an ink composition or a toner composition with improved dispersibility of a coloring material or solid material can be provided by polymerizing the novel polymerizable compound of the present invention.

In addition, a composition such as an ink composition or a toner composition and a recording material can be provided by blending the polymer compound of the present invention with a solvent, a dispersant, or a coloring material.

Furthermore, various image-forming methods and image-forming apparatuses using ink compositions, toner compositions, and so on with the polymer compound of the present invention can be provided.

BEST MODES FOR CARRYING OUT THE INVENTION

Hereinafter, the present invention will be described in detail.

According to an aspect of the present invention, there is provided a polymerizable compound represented by the following general formula (1):

$$XO(AO)_m B(D)_n SO_3 R \qquad \text{General formula (1):}$$

(where X represents an alkenyl group; A represents a linear or branched alkylene group having a carbon atom number of 1 to 15, which may be substituted; m represents an integer of 0 to 30, if m is a plural number, each A may be different; B represents a single bond or an alkylene group which may be substituted; D represents an aromatic ring structure which may be substituted; n represents an integer of 0 to 10, if n is a plural number, each D may be different; and R represents a hydrogen atom, an alkyl group which may be substituted, or an aromatic ring structure which may be substituted).

Preferably, a compound represented by the following formula (4) can be represented.

$$CH_2=CHO(AO)_m B(D)_n SO_3 R \qquad \text{General formula (4):}$$

In the general formula (4), A represents a linear or branched alkylene group having a carbon atom number of 1 to 15, preferably 2 to 10, which may be substituted. The substituents for the alkylene group include methyl, ethyl, propyl, and phenyl.

m represents an integer of 0 to 30, preferably 1 to 10. In addition, if m is a plural number, each A may be different.

B represents a single bond or an alkylene group which may be substituted, where examples of the alkylene group include methylene, ethylene, propylene, butylene, pentylene, hexylene, heptylene, and octylene.

D represents an aromatic ring structure which may be substituted such as phenyl, pyridylene, pyrimidyl, naphthyl, anthranil, phenanthranyl, thiophenyl, or furanyl.

n represents an integer of 0 to 10, preferably 1 to 5. If n is a plural number, each D may be different.

R represents a hydrogen atom, an alkyl group which may be substituted, or an aromatic ring structure which may be substituted. As the alkyl group, preferable is one having a carbon atom number of 1 to 10. The examples of the aromatic ring group include a phenyl group, a pyridyl group, and a biphenyl group. The substituents include an alkyl group and an alkoxy group.

The polymerizable compound represented by the general formula (1) of the present invention is characterized in that the terminal end thereof is a sulfonic acid derivative. The sulfonic acid derivative can be easily derived into sulfonic acid or sulfonate and is high in acidity as acid. Thus, it is quite useful in that it is possible to provide various functional polymer materials, which are ionic and high in dissociation degree, as polymer compounds having vinyl ether repetitive unit structures. In addition, it is very useful as a high-polarity compound even if it is in the form of a derivative of sulfonic acid ester or the like.

The specific examples of the polymerizable compound represented by the general formula (1) include compounds shown below.

$CH_2=CHOCH_2CH_2OPhSO_3C_2H_5$
$CH_2=CHOCH_2CH_2OPhSO_3H$
$CH_2=CHOCH_2CH_2PhSO_3CH_3$
$CH_2=CHOCH_2CH_2PhSO_3C_2H_5$
$CH_2=CHOCH_2CH_2OPhPhSO_3C_2H_5$
$CH_2=CHOCH_2CH_2ONpSO_3C_2H_5$
$CH_2=CHOCH_2CH_2CH_2SO_3C_2H_5$
$CH_2=CHOCH_2CH_2CH_2PhSO_3CH_3$
$CH_2=CHOCH_2CH(CH_3)OPhSO_3C_2H_5$
$CH_2=CHOCH_2CH(C_2H_5)_{OPhSO_3}C_2H_5$
$CH_2=CHOCH_2CH(C_3H_7)OPhSO_3C_2H_5$
$CH_2=CHO(CH_2CH_2O)_2PhSO_3C_3H_7$
$CH_2=CHO(CH_2CH_2O)_2PhSO_3CH_3$
$CH_2=CHO(CH_2CH_2O)_2PhSO_3C_2H_5$
$CH_2=CHO(CH_2CH_2O)_3PhSO_3C_2H_5$
$CH_2=CHO(CH_2CH_2O)_2NpSO_3C_2H_5$
$CH_2=CHO(CH_2CH_2O)_3NpSO_3C_2H_5$
$CH_2=CHO(CH_2CH_2O)_3NpSO_3H$
$CH_2=CHOCH_2CH_2O(CH_2)_2PhSO_3CH_3$
$CH_2=CHOCH_2CH_2O(CH_2)_3PhSO_3CH_3$
$CH_2=CHOCH_2CH_2O(CH_2)_4PhPhSO_3CH_3$
$CH_2=CHOCH_2CH_2O(CH_2)_5NpSO_3CH_3$
$CH_2=CHO(CH_2CH_2O)_6PhSO_3CH_3$
$CH_2=CHO(CH_2CH_2O)_7PhPhSO_3CH_3$
$CH_2=CHOCH_2CH_2O(CH_2CH_2CH_2O)_2PhSO_3CH_3$
$CH_2=CHOCH_2CH_2OPyPhSO_3CH_3$
$CH_2=CHOCH_2CH_2OPyPhSO_3C_2H_5$
$CH_2=CHOCH_2CH_2O(CH_2)_{20}SO_3CH_3$
$CH_2=CHO(CH_2CH_2O)_2(CH_2)_2PhSO_3C_2H_5$
$CH_2=CHO(CH_2CH_2O)_3(CH_2)_3PhSO_3C_2H_5$
$CH_2=CHO(CH_2CH_2O)_{10}PhSO_3C_2H_5$
$CH_2=CHO(CH_2CH_2O)_{20}PhSO_3C_2H_5$
$CH_2=CHO(CH_2CH_2O)_2(CH_2)_6OPhSO_3C_2H_5$
$CH_2=CHO(CH_2CH_2O)_5(CH_2)_7OPhSO_3C_2H_5$
$CH_2=CHO(CH_2CH_2O)_6(CH_2)_8OPhSO_3C_2H_5$
$CH_2=CHO(CH_2CH_2O)_{10}(CH_2)_{10}OPhSO_3C_2H_5$
$CH_2=CHO(CH_2CH_2O)_{15}(CH_2)_{15}OPhSO_3C_2H_5$

CH$_2$=CHO(CH$_2$CH$_2$O)$_2$(CH$_2$)$_{20}$OPhSO$_3$C$_2$H$_5$
CH$_2$=CHOCH$_2$CH$_2$CH$_2$CH$_2$CH$_2$CH$_2$CH$_2$O(CH$_2$)$_2$OPhSO$_3$C$_2$H$_5$
CH$_2$=CHOCH$_2$CH$_2$CH$_2$CH$_2$O(CH$_2$)$_3$OPhSO$_3$C$_2$H$_5$
CH$_2$=CHOCH$_2$CH$_2$CH$_2$CH$_2$O(CH$_2$)$_4$OPhSO$_3$C$_2$H$_5$
CH$_2$=CHOCH$_2$CH$_2$CH$_2$CH$_2$CH$_2$CH$_2$CH$_2$O(CH$_2$)$_5$OPhSO$_3$C$_2$H$_5$
CH$_2$=CHOCH$_2$CH$_2$CH$_2$CH$_2$CH$_2$CH$_2$O(CH$_2$)$_6$OPhSO$_3$C$_2$H$_5$
CH$_2$=CHOCH(CH$_3$)CH$_2$O(CH$_2$)$_7$OPhSO$_3$C$_2$H$_5$
CH$_2$=CHOCH(CH$_3$)CH$_2$O(CH$_2$)$_8$OPhSO$_3$C$_2$H$_5$
CH$_2$=CHOCH$_2$CH(CH$_3$)O(CH$_2$)$_{10}$OPhSO$_3$C$_2$H$_5$
CH$_2$=CHOCH$_2$CH(C$_2$H$_5$)CH$_2$O(CH$_2$)$_{15}$OPhSO$_3$C$_2$H$_5$
CH$_2$=CHOCH$_2$CH(CH$_3$)O(CH$_2$)$_{20}$OPhSO$_3$C$_2$H$_5$
CH$_2$=CHOCH$_2$CH$_2$O(CH$_2$)$_2$OPhSO$_3$PhH
CH$_2$=CHOCH$_2$CH$_2$O(CH$_2$)$_3$OPhSO$_3$CH$_2$PhH
CH$_2$=CHOCH$_2$CH$_2$O(CH$_2$)$_4$OPhSO$_3$PyrH
CH$_2$=CHOCH$_2$CH$_2$CH$_2$CH$_2$O(CH$_2$)$_5$OPyrSO$_3$PhH
CH$_2$=CHOCH$_2$CH$_2$O(CH$_2$)$_6$OPhSO$_3$Ph(OCH$_3$)
CH$_2$=CHO(CH$_2$CH$_2$O)$_2$(CH$_2$)$_7$OPhSO$_3$Ph(OCH$_3$)
CH$_2$=CHOCH$_2$CH$_2$O(CH$_2$)$_8$OPhSO$_3$Ph(OCH$_3$)
CH$_2$=CHOCH$_2$CH$_2$O(CH$_2$)$_{10}$OPhSO$_3$Ph(OCH$_3$)
CH$_2$=CHOCH$_2$CH$_2$O(CH$_2$)$_{15}$OPhSO$_3$Ph(OCH$_3$)
CH$_2$=CHOCH$_2$CH$_2$O(CH$_2$)$_{20}$OPhSO$_3$Ph(OCH$_3$)

(Ph represents 1,4-phenyl or 1,3-phenyl. Py represents 2,5-pyrimidyl and Pyr represents 2,5-pyridyl. Np represents 2,6-naphthyl, 1,4-naphtyl, or 1,5-naphthyl.)

Methods for synthesizing the polymerizable compound represented by the general formula (1) typically include an etherification process such as one represented by the following reaction formula (1).

Reaction formula (1):

CH$_2$=CHOCH$_2$CH$_2$X + HOPhSO$_3$CH$_3$ $\xrightarrow{\text{Base}}$ CH$_2$=CHOCH$_2$CH$_2$OPhSO$_3$CH$_3$ (X represents halogen.)

Alternatively, it is synthesized by use of a reaction known as the Mitsunobu reaction represented by the following reaction formula (2).

Reaction Formula (2):

CH$_2$=CHOCH$_2$CH$_2$OH + HOPhSO$_3$CH$_3$ $\xrightarrow{\substack{\text{Triphenylphosphine} \\ \text{Amine Diethyl} \\ \text{azodicarboxylate}}}$ CH$_2$=CHOCH$_2$CH$_2$OPhSO$_3$CH$_3$ According to another aspect of the present invention, there is provided a polymer compound including a repetitive unit structure represented by the following general formula (2):

General formula (2):

——(X')——
|
O(AO)$_m$B(D)$_n$SO$_3$R (where X' represents a polyalkenyl group; A represents a linear or branched alkylene group having a carbon atom number of 1 to 15, which may be substituted; m represents an integer of 0 to 30, if m is a plural number, each A may be different; B represents a single bond or an alkylene group which may be substituted; D represents an aromatic ring structure which may be substituted; n represents an integer of 0 to 10, if n is a plural number, each D may be different; and R represents a hydrogen atom, an alkyl group which may be substituted, or an aromatic ring structure which may be substituted).

Preferably, compounds represented by the following general formula (5) can be exemplified.

General formula (5):

——(CH$_2$—CH)——
|
O(AO)$_m$B(D)$_n$SO$_3$R

Note that the preferable ranges of A, m, B, D, n, and R and their specific examples are the same as those of the general formula (1).

The general formula (2) of the present invention is characterized in that the terminal end thereof is a sulfonic acid derivative. The sulfonic acid derivative can be easily derived into sulfonic acid or sulfonate and is high in acidity as acid. Thus, it is quite useful in that it is possible to provide various functional polymer materials, which are ionic and high in dissociation degree, as polymer compounds having vinyl ether repetitive unit structures. In addition, it is very useful as a high-polarity compound even if it is in the form of a derivative of sulfonic acid ester or the like.

The specific examples of the repetitive unit structure represented by the general formula (2) include unit structures shown below.

——(CH$_2$—CH)——
|
OCH$_2$CH$_2$OPhSO$_3$CH$_3$

——(CH$_2$—CH)——
|
OCH$_2$CH$_2$OPhSO$_3$H

——(CH$_2$—CH)——
|
OCH$_2$CH$_2$PhSO$_3$CH$_3$

——(CH$_2$—CH)——
|
OCH$_2$CH$_2$PhSO$_3$C$_2$H$_5$

——(CH$_2$—CH)——
|
OCH$_2$CH$_2$OPhPhSO$_3$C$_2$H$_5$

——(CH$_2$—CH)——
|
OCH$_2$CH$_2$NpSO$_3$C$_2$H$_5$

——(CH$_2$—CH)——
|
OCH$_2$CH$_2$CH$_2$PhSO$_3$C$_2$H$_5$

——(CH$_2$—CH)——
|
OCH$_2$CH$_2$CH$_2$PhSO$_3$CH$_3$

——(CH$_2$—CH)——
|
OCH$_2$CH(CH$_3$)OPhSO$_3$C$_2$H$_5$

——(CH$_2$—CH)——
|
OCH$_2$CH(C$_2$H$_5$)OPhSO$_3$C$_2$H$_5$

——(CH$_2$—CH)——
|
OCH$_2$CH(C$_3$H$_7$)OPhSO$_3$C$_2$H$_5$

(Ph represents 1,4-phenyl or 1,3-phenyl. Py represents 2,5-pyrimidyl and Pyr represents 2,5-pyridyl. Np represents 2,6-naphtyl, 1,4-naphtyl, or 1,5-naphtyl.)

The polymer compounds having the repetitive unit structures represented by the general formula (2) described above can be preferably obtained by polymerizing polymerizable compounds represented by the general formula (1), respectively. In many cases, the polymerization is performed by cationic polymerization. Initiators therefor include combinations of cationic sources with proton acids such as hydrochloric acid, sulfuric acid, methanesulfonic acid, trifluoroacetic acid, trifluoromethane sulfonic acid, and perchloric acid, and Lewis acids such as $BF_3$, $AlCl_3$, $TiCl_4$, $SnCl_4$, $FeCl_3$, $RAlCl_2$, and $R_{1.5}AlCl_{1.5}$ (R represents alkyl) (the cationic sources include proton acid, water, alcohol, and aduct between vinyl ether and carboxylic acid). By letting these initiators coexist with the polymerizable compounds (monomers) represented by the general formula (1), polymerization reaction proceeds so that polymer compounds can be synthesized.

The number average molecular weight of the polymer compound having the repetitive unit structure represented by the general formula (2) of the present invention is 200 to 10,000,000, and the range thereof preferably used is 1,000 to 1,000,000. If it exceeds 10,000,000, entanglements in macromolecule strands or between macromolecule strands increase too much and may make them difficult to be dispersed in solvents. If it is less than 200, the molecular weight is small and a steric effect as a macromolecule may be hard to come out. In addition, the polymer compound of the present invention may be a homo polymer consisting of a single repetitive unit structure or may be a copolymerized polymer consisting of a plurality of repetitive unit structures.

According to another aspect of the present invention, there is provided a polymer compound including a repetitive unit structure represented by the following general formula (3):

General formula (3):

(where X' represents a polyalkenyl group; A represents a linear or branched alkylene group having a carbon atom number of 1 to 15, which may be substituted; m represents an integer of 0 to 30, if m is a plural number, each A may be different; B represents a single bond or an alkylene group which may be substituted; D represents an aromatic ring structure which may be substituted; n represents an integer of 0 to 10, if n is a plural number, each D may be different; and M represents a monovalent or polyvalent metal cation).

Preferably, a polymer compound including a repetitive unit structure represented by the following general formula (6) can be exemplified:

General formula (6):

(where A represents a linear or branched alkylene group having a carbon atom number of 1 to 15, which may be substituted; m represents an integer of 0 to 30, if m is a plural number, each A may be different; B represents a single bond or an alkylene group which may be substituted; D represents an aromatic ring structure which may be substituted; n represents an integer of 0 to 10, if n is a plural number, each D may be different; and M represents a monovalent or polyvalent metal cation).

Note that the preferable ranges of A, m, B, D, and n and their specific examples are the same as those of the general formula (1).

M represents a monovalent or polyvalent metal cation. As the specific examples of M, the monovalent metal cations include lithium, sodium, and potassium, and the polyvalent metal cations include magnesium, calcium, nickel, and iron. If M is a polyvalent metal cation, M forms a counter ion with two or more of $SO_3^-$ anions.

The polymer compound having the repetitive unit structure of the general formula (3) of the present invention can be obtained by subjecting the ester portion on the terminal end of the corresponding polymer compound having the repetitive unit structure of the general formula (2) to alkaline hydrolysis or alkali neutralization. It can be also obtained by an alkali treatment after acid hydrolysis, but the former is preferable.

The specific examples of the repetitive unit structure represented by the general formula (3) include unit structures shown below.

-continued

—(CH$_2$—CH)—
            |
            O(CH$_2$CH$_2$O)$_3$NpSO$_3$—M

—(CH$_2$—CH)—
            |
            O(CH$_2$CH$_2$O)$_3$NpSO$_3$—M

—(CH$_2$—CH)—
            |
            OCH$_2$CH$_2$O(CH$_2$)$_2$PhSO$_3$—M

—(CH$_2$—CH)—
            |
            OCH$_2$CH$_2$O(CH$_2$)$_3$PhSO$_3$—M

—(CH$_2$—CH)—
            |
            OCH$_2$CH$_2$O(CH$_2$)$_4$PhPhSO$_3$—M

—(CH$_2$—CH)—
            |
            OCH$_2$CH$_2$O(CH$_2$)$_5$NpSO$_3$—M

—(CH$_2$—CH)—
            |
            O(CH$_2$CH$_2$O)$_6$PhSO$_3$—M

—(CH$_2$—CH)—
            |
            O(CH$_2$CH$_2$O)$_7$PhPhSO$_3$—M

—(CH$_2$—CH)—
            |
            OCH$_2$CH$_2$O(CH$_2$CH$_2$CH$_2$O)$_2$PhSO$_3$—M

—(CH$_2$—CH)—
            |
            OCH$_2$CH$_2$PyPhSO$_3$—M

—(CH$_2$—CH)—
            |
            OCH$_2$CH$_2$OPyPhSO$_3$—M

—(CH$_2$—CH)—
            |
            OCH$_2$CH$_2$O(CH$_2$)$_{20}$SO$_3$—M

—(CH$_2$—CH)—
            |
            O(CH$_2$CH$_2$O)$_2$(CH$_2$)$_2$PhSO$_3$—M

—(CH$_2$—CH)—
            |
            O(CH$_2$CH$_2$O)$_3$(CH$_2$)$_3$PhSO$_3$—M

—(CH$_2$—CH)—
            |
            O(CH$_2$CH$_2$O)$_{10}$PhSO$_3$—M

—(CH$_2$—CH)—
            |
            O(CH$_2$CH$_2$O)$_{20}$PhSO$_3$—M

—(CH$_2$—CH)—
            |
            O(CH$_2$CH$_2$O)$_2$(CH$_2$)$_6$OPhSO$_3$—M

—(CH$_2$—CH)—
            |
            O(CH$_2$CH$_2$O)$_6$(CH$_2$)$_7$OPhSO$_3$—M

—(CH$_2$—CH)—
            |
            O(CH$_2$CH$_2$O)$_6$(CH$_2$)$_8$OPhSO$_3$—M

—(CH$_2$—CH)—
            |
            O(CH$_2$CH$_2$O)$_{10}$(CH$_2$)$_{10}$OPhSO$_3$—M

—(CH$_2$—CH)—
            |
            O(CH$_2$CH$_2$O)$_{16}$(CH$_2$)$_{16}$OPhSO$_3$—M

—(CH$_2$—CH)—
            |
            O(CH$_2$CH$_2$O)$_2$(CH$_2$)$_{20}$OPhSO$_3$—M

—(CH$_2$—CH)—
            |
            OCH$_2$CH$_2$CH$_2$CH$_2$CH$_2$CH$_2$CH$_2$CH$_2$O(CH$_2$)$_2$OPhSO$_3$—M

—(CH$_2$—CH)—
            |
            OCH$_2$CH$_2$CH$_2$CH$_2$O(CH$_2$)$_3$OPhSO$_3$—M

-continued

—(CH$_2$—CH)—
            |
            OCH$_2$CH$_2$CH$_2$CH$_2$O(CH$_2$)$_4$OPhSO$_3$—M

—(CH$_2$—CH)—
            |
            OCH$_2$CH$_2$CH$_2$CH$_2$CH$_2$CH$_2$CH$_2$CH$_2$O(CH$_2$)$_5$OPhSO$_3$—M

—(CH$_2$—CH)—
            |
            OCH$_2$CH$_2$CH$_2$CH$_2$CH$_2$CH$_2$O(CH$_2$)$_6$OPhSO$_3$—M

—(CH$_2$—CH)—
            |
            OCH(CH$_3$)CH$_2$O(CH$_2$)$_7$OPhSO$_3$—M

—(CH$_2$—CH)—
            |
            OCH(CH$_3$)CH$_2$O(CH$_2$)$_8$OPhSO$_3$—M

—(CH$_2$—CH)—
            |
            OCH$_2$CH(CH$_3$)O(CH$_2$)$_{10}$OPhSO$_3$—M

—(CH$_2$—CH)—
            |
            OCH(C$_2$H$_5$)CH$_2$O(CH$_2$)$_{16}$OPhSO$_3$—M

—(CH$_2$—CH)—
            |
            OCH$_2$CH(CH$_3$)O(CH$_2$)$_{20}$OPhSO$_3$—M

—(CH$_2$—CH)—
            |
            OCH$_2$CH$_2$O(CH$_2$)$_2$PhSO$_3$—M

—(CH$_2$—CH)—
            |
            OCH$_2$CH$_2$O(CH$_2$)$_3$OPhSO$_3$—M

—(CH$_2$—CH)—
            |
            OCH$_2$CH$_2$O(CH$_2$)$_4$OPhSO$_3$—M

—(CH$_2$—CH)—
            |
            OCH$_2$CH$_2$CH$_2$CH$_2$O(CH$_2$)$_5$OPyrSO$_3$—M

—(CH$_2$—CH)—
            |
            OCH$_2$CH$_2$O(CH$_2$)$_6$OPhSO$_3$—M

—(CH$_2$—CH)—
            |
            O(CH$_2$CH$_2$O)$_2$(CH$_2$)$_7$OPhSO$_3$—M

—(CH$_2$—CH)—
            |
            OCH$_2$CH$_2$O(CH$_2$)$_8$OPhSO$_3$—M

—(CH$_2$—CH)—
            |
            OCH$_2$CH$_2$O(CH$_2$)$_{10}$OPhSO$_3$—M

—(CH$_2$—CH)—
            |
            OCH$_2$CH$_2$O(CH$_2$)$_{15}$SO$_3$—M

—(CH$_2$—CH)—
            |
            OCH$_2$CH$_2$O(CH$_2$)$_{20}$OPhSO$_3$—M (Ph represents 1,4-phenyl or 1,3-phenyl. Py represents 2,5-pyrimidyl and Pyr represents 2,5-pyridyl. Np represents 2,6-naphthyl, 1,4-naphthyl, or 1,5-naphthyl. Indicated inside the parentheses after the aromatic ring portion is a substituent of the aromatic ring).

The number average molecular weight of the polymer compound having the repetitive unit structure represented by the general formula (3) of the present invention is 200 to 10,000,000, and the range thereof preferably used is 1,000 to 1,000,000. If it exceeds 10,000,000, entanglements in macromolecule strands or between macromolecule strands increase too much and may make them difficult to be dispersed in solvents. If it is less than 200, the molecular weight is small and a steric effect as a macromolecule may be hard to come out. The polymer compound of the present invention may be a homo polymer consisting of a single repetitive unit structure or may be a copolymerized polymer consisting of a plurality of repetitive unit structures.

Furthermore, the present invention relates to a block polymer characterized by containing a repetitive unit constructed of an alkenyl ether structure having one selected from sulfonic acid, sulfonic acid ester, and sulfonate in the side chain of at least one block segment, preferably a block polymer which is a composition containing a polymer compound having a repetitive unit structure represented by the general formula (2) or (3) and preferably having at least one kind of a hydrophobic block segment in addition to the block segment containing the repetitive unit structure of the general formula (2) or (3) because it is preferable to be amphiphatic so as to include a pigment and exhibit preferable dispersibility. In a state of being amphiphatic, the block polymer tends to have a micellar structure. Thus, it becomes possible to include a functional substance in the core part of a micelle or adsorb the functional substance on the hydrophobic part thereof to allow the functional substance to be favorably dispersed. An amphiphatic property can be expressed when at least one block segment in the block polymer of the present invention is hydrophobic and at least one block segment thereof is hydrophilic. The specific examples of the hydrophobic block segment include those described below.

(Ph represents a phenylene or phenyl group.)

In addition, each block segment of the block polymer of the present invention may consist of a single repetitive unit or may consist of a plurality of repetitive unit structures. The examples of the block segment consisting of a plurality of repetitive unit structures include a random copolymer and a graduation copolymer having a gradual change in composition ratio. Furthermore, the block polymer of the present invention is a block polymer having two or more block segments, or it may be a polymer in which these block polymers are made graft polymerization with other polymers.

In the present invention, desirably, the content of the repetitive unit structure represented by the general formula (1) contained in the polymer compound is 0.01 to 99 mol %, preferably 1 to 90 mol %, with respect to the entire polymer compound. If it is less than 0.01 mol %, the macromolecule interaction which sulfonic acid, sulfonic acid ester, or sulfonate should commit may be inadequate. If it exceeds 99 mol %, in contrast, the interaction works too much and the function may be inadequate.

The number average molecular weight (Mn) of the block polymer of the present invention is 200 to 10,000,000, and the range thereof preferably used is 1,000 to 1,000,000. If it exceeds 10,000,000, entanglements in macromolecule strands or between macromolecule strands increase too much and may make them difficult to be dispersed in solvents. If it is less than 200, the molecular weight is small and a steric effect as a macromolecule may be hard to come out. A preferable polymerization degree of each block segment is 3 to 10,000. More preferable is 5 to 5,000. Still more preferable is 10 to 4,000.

For improving a dispersion stability and inclusion property (inclusion), it is preferable that the molecular mobility of a block polymer is more flexible because of having a physical affinity to be entangled with the surface of a functional substance. Furthermore, as described later, the flexibility is preferable because of having a tendency to form a coating layer on a recording medium. For this purpose, the main chain of the block polymer has a glass transition temperature Tg of preferably 20° C. or less, more preferably 0° C. or less, and still more preferably −20° C. or less. In this regard as well, the polymer having the polyvinyl ether structure is preferably used because of generally having a low glass transition point and flexible characteristics. In the case of the above-described example of the repetitive unit structure, the glass transition temperatures are mostly about −20° C. or less. The inclusion in the present invention is defined as that a block polymer forms a micelle or a reversed micelle so as to surround and include a pigment, and this phenomenon can be confirmed by an electron microscope or the like.

Furthermore, the present invention is a recording material composition characterized by containing a solvent or a dispersion medium, a functional material, and the block polymer composition. As the functional substance, for example, a metal, herbicide, insecticide, bio material, or drug can be used.

Furthermore, the polymer compounds of the general formulas (2) and (3) of the present invention can be used as favorable water-soluble polymer compounds also used as adhesives, binders, or the like, so that the existence of a functional substance may not be required.

The functional substance to be used in the composition of the present invention is preferably 0.1 to 50% by mass with respect to the weight of the composition of the present invention. In addition, it may be a soluble substance, and also a dye, molecular catalyst, or the like can be used.

In addition, the polymer compound having the repetitive unit structure represented by the general formula (2) or (3) to be contained in the composition of the present invention is preferably 0.5 to 98% by mass with respect to the weight of the composition of the present invention.

Also preferable is to be a toner composition or an ink composition, which is characterized by containing the recording material described above. Hereinafter, the specific examples of preferable pigments and dyes will be described. The pigments may be any of organic pigments and inorganic pigments, and the pigments used for ink preferably include a black pigment, and pigments of three primary colors of cyan, magenta, and yellow. Note that color pigments other than those mentioned above, colorless or light color pigments, metallic luster pigments, and so on may be used. In addition, pigments newly compounded for the present invention may be used.

Examples of commercially available pigments black, cyan, magenta, and yellow will be given below.

Examples of the black pigments include but are not limited to Raven 1060 (manufactured by Colombian Carbon Co.), MOGUL-L (manufactured by Cabot Corporation), Color Black FW1 (manufactured by Degussa Corporation), and MA100 (manufactured by Mitsubishi Chemical Corporation).

Examples of the cyan pigment include but are not limited to C.I. Pigment Blue-15:3, C.I. Pigment Blue-15:4, and C.I. Pigment Blue-16.

Examples of the magenta pigment include but are not limited to C.I. Pigment Red-122, C.I. Pigment Red-123, and C.I. Pigment Red-146.

Examples of the yellow pigment include but are not limited to C.I. Pigment Yellow-74, C.I. Pigment Yellow-128, and C.I. Pigment Yellow-129.

Furthermore, when an organic pigment containing a nitrogen atom is dispersed, the dispersion may not be suitably performed even if a binder resin is an amphiphatic block polymer. In particular, in azo and quinacridone pigments represented by C.I. Pigment YELLOW 74, C.I. Pigment YELLOW 128, and C.I. Pigment Red 122, the dispersion may not be suitably performed. However, when the block polymer described in the present invention is used as a binder resin, it is possible to form a suitable pigment dispersing element of the organic pigment as described above. In the case of the block polymer described in the present invention, as the dissociation degree of the sulfone group of a hydrophilic block segment is large, the hydrophilicity of the hydrophilic block segment increases and the difference between hydrophilicity and hydrophobicity becomes remarkable. For this reason, as the hydrophobic block segment further selectively increases its affinity to the organic pigment described above in water, so that suitable pigment dispersion may be allowable. Furthermore, according to the present invention, it is also possible to prepare an ink composition in which the pigments are included in the block polymer. Note that the amphiphatic block polymer described in the present invention tends to have a micellar structure and tends to form included ink by enclosing a functional substance in the core part of the micelle or adsorbing the functional substance on the hydrophobic part thereof. Thus, it becomes possible to disperse the functional substance in a favorable manner. The included ink is able to form an ink composition enclosing a pigment by mixing the block polymer described in the present invention with an organic pigment in an organic solvent such as N,N-dimethyl formaldehyde or tetrahydrofuran and adding water therein to perform a phase inversion to an aqueous phase. The inclusion in the present invention allows the dispersion of a functional substance in a favorable manner by enclosing the functional substance in the core part of a micelle or adsorbing the functional substance on the hydrophobic part thereof. In addition, it is possible to dramatically increase the resistance of the functional substance to the environment by enclosing the functional substance and it is also possible to dramatically reduce unfavorable influence of the surface characteristics in the composition.

Furthermore, in the composition of the present invention, pigments which are self-dispersible in water can be used. The pigments which are self-dispersible in water include those utilizing the steric hindrance effects of adsorbing polymers on the pigment surfaces and those utilizing electrostatic repulsive forces, and marketed products thereof include CAB-O-JET 200 and CAB-O-JET 300 (both manufactured by Cabot Corp.) and Microjet Black CW-1 (manufactured by Orient Chemical Industries, Ltd.).

The pigments to be used in the ink composition of the present invention are preferably 0.1 to 50% by mass with respect to the weight of the ink composition. If the amount of a pigment becomes less than 0.1% by mass, a sufficient image density will no longer be obtained. If it exceeds 50% by mass, the fixability of an image may get worse. Furthermore, the preferable range is from 0.5% by mass to 30% by mass.

Further, dyes may also be used for the ink composition of the present invention. The following direct dyes, acid dyes, basic dyes, reactive dyes, water-soluble dyes for food coloring, insoluble pigments of disperse dyes, and fat-soluble dyes may be used. Examples of the fat-soluble dyes include: C.I. Solvent Blue-33, -67 and -135; C.I. Solvent Red-25, -97, and -219; and C.I. Solvent Yellow-1, -82 and -154.

Examples of the water-soluble dyes include:

direct dyes such as C.I. Direct Black-17, -62, and -154; C.I. Direct Yellow-12, -87, and -142; C.I. Direct Red-1, -62, and -243; C.I. Direct Blue-6, -78, and -199; C.I. Direct Orange-34 and -60; C.I. Direct Violet-47 and -48: C.I. Direct Brown-109; and C.I. Direct Green-59;

acid dyes such as C.I. Acid Black-2, -52, and -208; C.I. Acid Yellow-11, -29, and -71; C.I. Acid Red-1, -52, and -317; C.I. Acid Blue-9, -93, and -254; C.I. Acid Orange-7 and -19; and C.I. Acid Violet-49;

reactive dyes such as C.I. Reactive Black-1, -23, and -39; C.I. Reactive Yellow-2, -77, and -163; C.I. Reactive Red-3, -111, and -221; C.I. Reactive Blue-2, -101, and -217; C.I. Reactive Orange-5, -74, and -99; C.I. Reactive Violet-1, -24, and -38; C.I. Reactive Green-5, -15, and -23; and C.I. Reactive Brown-2, -18, and -33; and C.I. Basic Black-2; C.I. Basic Red-1, -12, and -27; C.I. Basic Blue-1 and -24; C.I. Basic Violet-7, -14, and -27; and C.I. Food black-1 and -2.

Further, commercially available products of the oil-soluble dye for each of the colors are given.

Examples of the black oil-soluble dye include but are not limited to C.I. Solvent Black-3, -22:1, and -50.

Examples of the yellow oil-soluble dye include but are not limited to C.I. Solvent Yellow-1, -25:1, and -172.

Examples of the orange oil-soluble dye include but are not limited to C.I. Solvent Orange-1, -40:1, and -99.

Examples of the red oil-soluble dye include but are not limited to C.I. Solvent Red-1, -111, and -229.

Examples of the violet oil-soluble dye include but are not limited to C.I. Solvent Violet-2, -11, and -47.

Examples of the blue oil-soluble dye include but are not limited to C.I. Solvent Blue-2, -43, and -134.

Examples of the green oil-soluble dye include but are not limited to C.I. Solvent Green-1, -20, and -33.

Examples of the brown oil-soluble dye include but are not limited to C.I. Solvent Brown-1, -12, and -58.

Note that even though these examples of the coloring materials described above are preferable for the ink of the present invention, the coloring materials to be used in the ink composition of the present invention are not specifically limited to the above coloring materials. The dye to be used in the ink composition of the present invention is preferably 0.1 to 50% by mass with respect to the weight of the ink.

Furthermore, as an example of the composition of the present invention, there is a recording material composition containing a solvent or a dispersion medium, a coloring material, and the repetitive unit structure represented by the general formula (2) or (3).

Specific examples of the recording material include a toner composition containing a dispersion medium such as a binder resin, a coloring material, and a polymer compound having a repetitive unit structure represented by the general formula (2) or (3).

In addition, a composition containing a solvent, a coloring material, and a polymer compound having the repetitive unit structure represented by the general formula (2) or (3) is exemplified.

Hereinafter, an ink composition as a preferable embodiment of the present invention will be described.

The content of the polymer compound having the repetitive unit represented by the general formula (2) or (3) to be contained in the ink composition of the present invention is in the range of 0.1% by mass to 90% by mass, preferably 1% by mass to 80% by mass. For an inkjet printer, it is preferably used at a content of 1% by mass to 30% by mass.

Next, components other than the polymer compound to be contained in the ink composition of the present invention will be described in detail. The other components include an organic solvent, water, a water-based solvent, a coloring material, and an additive.

(Organic Solvent)

Examples of the organic solvent include a hydrocarbon solvent, an aromatic solvent, an ether solvent, an alcohol solvent, a ketone solvent, an ester solvent, and an amide solvent.

(Water)

Preferable examples of the water of the present invention include ion-exchanged water with metal ions or the like removed, pure water, and ultrapure water.

(Water-Based Solvent)

Examples of the water-based solvent include: polyhydric alcohols such as ethylene glycol, diethylene glycol, triethylene glycol, polyethylene glycol, propylene glycol, polypropylene glycol, and glycerin; polyhydric alcohol ethers such as ethylene glycol monomethyl ether, ethylene glycol monoethyl ether, ethylene glycol monobutyl ether, diethylene glycol monoethyl ether, and diethylene glycol monobutyl ether; and nitrogen-containing solvents such as N-methyl-2-pyrolidone, substituted pyrolidone, and triethanolamine. Further, to accelerate drying of an aqueous dispersion on a recording medium, monovalent alcohols such as methanol, ethanol, and isopropyl alcohol may also be used.

In the ink composition of the present invention the contents of the above organic solvent, water, and water-based solvent are preferably used so as to be in the range of 20 to 95% by mass with respect to the total weight of the ink composition. More preferable is in the range of 30 to 90% by mass.

(Additives)

In the composition of the present invention, if required, various additives, auxiliary agents, and so on can be added. As one of the additives, there is a dispersion stabilizing agent for stably dispersing a pigment in a solvent. The composition of the present invention has a function of dispersing a granular solid like a pigment by a polymer including a polyvinyl ether structure. However, if the dispersion is insufficient, an additional dispersion stabilizing agent may be added.

As the additional dispersion stabilizing agent, it is possible to use a resin or surfactant having both hydrophilic and hydrophobic parts. As the resin having both hydrophilic and hydrophobic parts, a copolymer between a hydrophilic monomer and a hydrophobic monomer is exemplified.

Examples of the hydrophilic monomer include acrylic acid, methacrylic acid, maleic acid, fumaric acid, the above carboxylic monoesters, vinyl sulfonic acid, styrene sulfonic acid, vinyl alcohol, acrylamide, and methacryloxyethyl phosphate. Examples of the hydrophobic monomer include styrene, styrene derivatives such as α-methylstyrene, vinylcyclohexane, vinyl naphthalene derivatives, acrylates, and methacrylates. The copolymer used may be one of various configurations such as a random copolymer, a block copolymer and graft copolymer. The above hydrophilic and hydrophobic monomers are obviously not limited to the examples given above.

Examples of the surfactant which may be used include an anionic surfactant, a nonionic surfactant, a cationic surfactant, and an amphoteric surfactant. Examples of the anionic surfactant include fatty acid salts, alkyl sulfate salts, alkylaryl sulfonate, alkyldiaryl ether disulfonate, dialkyl sulfosuccinate, alkyl phosphate, a naphthalenesulfonic acid formalin condensate, polyoxyethylene alkyl phosphate salts, and glycerol borate fatty ester. Examples of the nonionic surfactant include polyoxyethylene alkyl ether, a polyoxyethylene oxypropylene block copolymer, sorbitan fatty ester, glycerin fatty ester, polyoxyethylene fatty ester, polyoxyethylene alkylamine, fluorine-based, and silicon-based. Examples of the cationic surfactant include alkylamine salts, quaternary ammonium salts, alkylpyridinium salts, and alkylimidazolium salts. Examples of the amphoteric surfactant include: alkylbetaine, alkylamine oxide, and phosphatidylcholine. Note that the surfactant is also obviously not limited to the examples given.

Furthermore, a water-based solvent can be added to the composition of the present invention if required. In particular, in the case of using inkjet ink, the water-based solvent can be used for preventing the drying of ink in a nozzle portion and the solidification of ink and can be used by itself or by mixture. One described above is directly applied to the water-based solvent. In the case of ink, the content thereof is in the range of 0.1 to 60% by mass, preferably 1 to 40% by mass.

As the other additives, for example in the case of being used for ink, a pH regulator for obtaining the stabilization of ink and the stability of ink to piping in a recording apparatus, a penetrant for accelerating the penetration of ink into a recording medium and accelerating apparent drying, a mildewproofing agent for preventing the generation of mold in the ink, a chelating agent for blocking a metal ion in the ink, and preventing the precipitation of metal in a nozzle portion, precipitation of an insoluble material in the ink, and so on, a defoaming agent for preventing the circulation, movement, and so on of a recording liquid or preventing the generation of bubbles at the time of preparation of a recording liquid, an antioxide, a fungicide, a viscosity modifier, a conductive agent, an ultraviolet absorber, and so on can be added.

The ink composition of the present invention can be prepared by mixing the above structural components to uniformly dissolve or disperse. For instance, a plurality of structural components can be mixed, and crushed and dispersed by a sand mill, ball mill, homogenizer, nanomizer, or the like to prepare an ink base solution. The preparation is made by adding a solvent and an additive therein to adjust physical properties.

Next, the toner composition of the present invention will be described. Specifically, the toner composition contains a dispersant such as a binder resin, a coloring material, and a polymer compound having a repetitive unit structure represented by the general formula (2) or (3).

The content of the polymer compound having the repetitive unit represented by the general formula (2) or (3) to be contained in the toner composition of the present invention is in the range of 0.1 wt % to 90 wt %, preferably 0.5 wt % to 80 wt %.

Furthermore, the polymer compound of the present invention can be used as a binder resin itself, and can be also used together with a binder resin such as a styrene acryl resin or a polyester resin.

Next, components other than the polymer compound to be contained in the toner composition will be described in detail.

The other components include binder resins, color materials (pigments and dyes), charging-control agents, mold-releasing agents, external additives, and magnetic particles.

(Addition of other Components of the Toner Composition)

The binder resins include a styrene-acryl copolymer, polyester, and polycarbonate. The content of the binder resin is preferably 10% by mass to 99% by mass. As the coloring materials, pigments and dyes described in the description of the ink composition can be used. The content of the color material is 0.1% by mass to 50% by mass. The charging-control agents include a metal-azo complex, triphenylmethane dye, nigrosine, and ammonium salt. The content of the charging-control agent is 0.1% by mass to 30% by mass. In addition, the mold-releasing agents include synthetic wax and natural wax. The external additives include inorganic fine particles such as those of silica, alumina, and titania, and resin fine particles such as those of polyvinylidene fluoride (PVDF) and polytetrafluoroethylene. The magnetic particles include magnetite, hematite, and ferrite. The toner composition can function even if it does not include all the components described above, and may include components which are not described above.

As a method of preparing the toner composition of the present invention, toner having a desired size is obtained, for example, by mixing the structural components described above and uniformly mixing by melt kneading, followed by fracturing with a speed mill or jet mill to form toner and then dividing. The preparation can be performed by mixing an external additive to the toner and mixing them with a mixer.

Next, an image-forming method, a liquid-providing method, and an image-forming apparatus, which use the composition of the present invention, will be described.

(Image-Forming Method, Liquid-Providing Method, and Apparatus)

The ink composition of the present invention can be used in various image-forming methods including various printing methods, inkjet methods, and electrophotography, and apparatuses using these methods. Image formation can be performed by an image-forming method using such an apparatus. In addition, when a liquid composition is used, an inkjet method or the like can be used as a liquid-providing method for forming a fine pattern or administering a drug.

The image-forming method of the present invention is a method of forming an excellent image with the composition of the present invention. The image-forming method of the present invention is preferably an image-forming method that performs recording by providing the ink composition of the present invention to a recording medium by discharging it from an ink discharging part. As the image formation, the process uses an inkjet method for discharging ink by applying a thermal energy to ink.

An inkjet printer using the inkjet ink composition of the present invention can be Suitably applied to various inkjet recording apparatuses such as those of a piezo inkjet system using a piezoelectric element, and a bubble jet system for performing recording by applying a thermal energy to expand a bubble.

Hereinafter, regarding this inkjet recording apparatus, the outline will be described with reference to FIG. 1. However, FIG. 1 shows only an example of the invention, and the preferred embodiment is not limited.

Figure 1:
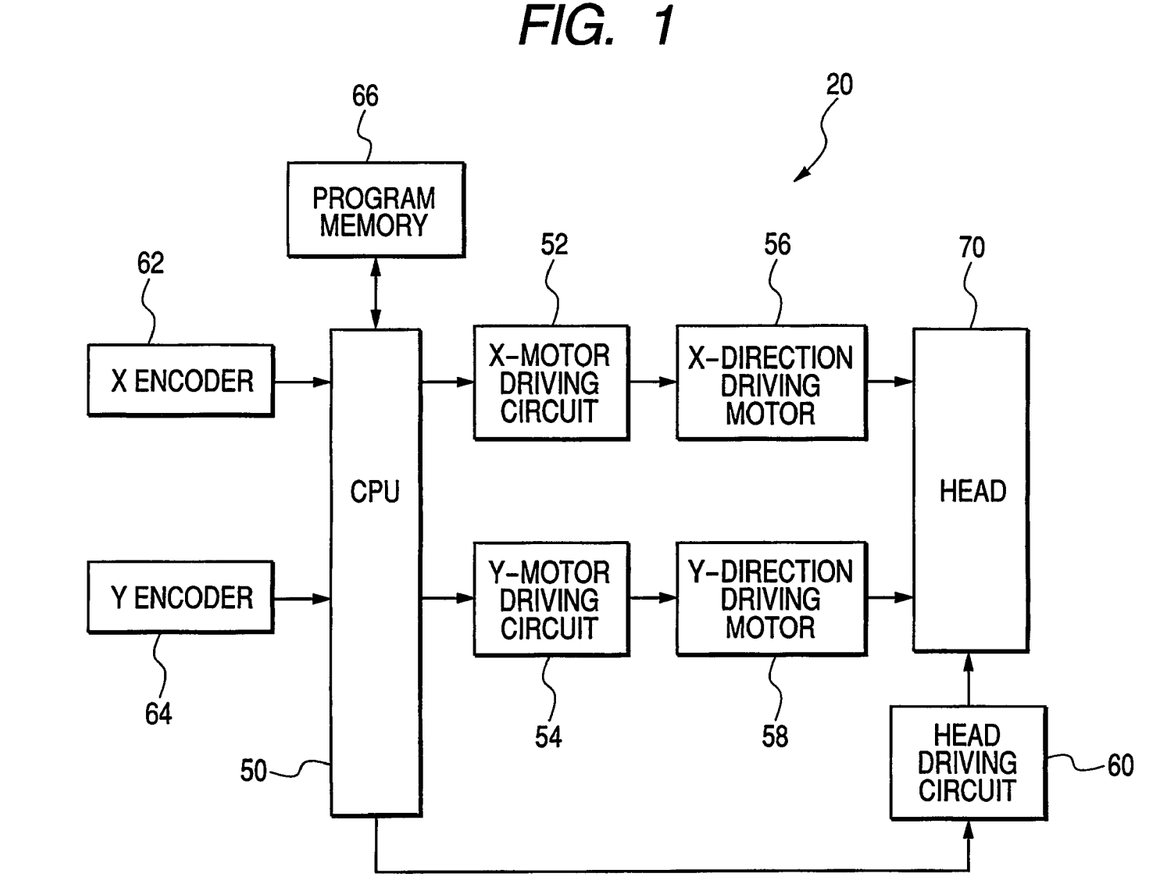
FIG. 1 is a block diagram that represents the configuration of an inkjet recording apparatus.

FIG. 1 is a block diagram showing the configuration of an inkjet recording apparatus.

FIG. 1 illustrates a case of moving a head to record on a recording medium. In FIG. 1, a CPU 50 for controlling the entire movement of a manufacturing apparatus is connected with an X-direction driving motor 56 and a Y-direction driving motor 58 for driving a head 70 in X and Y directions through an X-motor driving circuit 52 and a Y-motor driving circuit 54, respectively. According to instructions from the CPU 50, the position of the head 70 relative to the recording medium is defined by the X-direction driving motor 56 and the Y-direction driving motor 58 through the X-motor driving circuit52 and the Y-motor driving circuit 54.

As shown in FIG. 1, in addition to the X-direction driving motor 56 and the Y-direction driving motor 58, a head driving circuit 60 is connected with the head 70, so that the CPU 50 controls the head-driving circuit 60 to drive the head 70, i.e., to cause discharge of inkjet ink and so on. Furthermore, the CPU 50 is connected with an X encoder 62 and a Y encoder 64 for detecting the position of the head and the positional information of the head 70 is inputted thereto. In addition, a control program is also inputted into a program memory 66. The CPU 50 moves the head 70 on the basis of the control program and the positional information of the X encoder 62 and the Y encoder 64 to place the head in a desired position on the recording medium to discharge the inkjet ink. Consequently, a desired image can be formed on the recording medium. In addition, in the case of an image-recording apparatus which is capable of containing a plurality of inkjet inks, a desired image can be formed on a recording medium by carrying out the operation as described above for each inkjet ink a predetermined of times.

Moreover, after discharging the inkjet ink, if required, the head 70 can be moved to a position where there is removing means (not shown in the figure) for removing residual ink adhering to the head, and then can be cleaned by wiping or the like. As the specific method for the cleaning, the conventional method can be used without modification.

After completing the image formation, the image-formed recording medium is replaced with a new recording medium by a mechanism of transporting a recording medium (not shown).

Note that according to the present invention, the above embodiment can be modified or changed without departing from the gist thereof. For instance, in the above description, the example of moving the head 70 in the directions of X and Y axes was represented. However, image formation may be carried out by moving the head 70 only in the X-axis direction (or the Y-axis direction) while a recording medium is moved in the Y-axis direction (or the X-axis direction) to allow them to be interlocked with each other.

The present invention includes means for generating a thermal energy as an energy to be used for discharging inkjet ink (e.g., an electrothermal transducer or a laser beam), in which a head for discharging the inkjet ink by the thermal energy produces an excellent effect. According to such a method, an image formation with high definition can be attained. By use of the inkjet ink composition of the present invention, a more excellent image formation can be performed.

With regard to the typical configuration and principle of the apparatus having the above means for generating a thermal energy, those practiced by use of the basic principle disclosed in, for example, U.S. Pat. Nos. 4,723,129 and 4,740,796 are preferable. This system is applicable to either one of a so-called on-demand type and continuous type. In particular, in the case of the on-demand type, the system is effective because, by applying at least one driving signal, which corresponds to eject information and gives a rapid temperature rise exceeding nucleate boiling, to each of electrothermal transducers which maintain a liquid and are arranged in correspondence with a flow path, the electrothermal transducer is caused to generate heat energy to effect film boiling on the heat acting surface of the head, and consequently, a bubble can be formed in the liquid in one-to-one correspondence with the driving signal. By discharging the liquid through a discharge opening by growth and shrinkage of the bubble, at least one droplet is formed. If the driving signal is applied as a pulse signal, the growth and shrinkage of the bubble can be attained instantly and adequately to achieve discharge of the liquid with the particularly high response characteristics, which is preferable. As the pulse driving signal, signals described in U.S. Pat. Nos. 4,463,359 and 4,345,262 are suitable. Note that further excellent discharge can be performed by using the conditions described in U.S. Pat. No. 4,313,124 disclosing the invention which relates to the temperature rise rate of the heat acting surface.

As an arrangement of the head, in addition to the arrangement as a combination of discharge ports, liquid paths, and electrothermal transducers (linear liquid flow paths or right angle liquid flow paths) as disclosed in each of the above specifications, the arrangement using U.S. Pat. Nos. 4,558,333 and 4,459,600, which disclose the arrangement having a heat acting portion arranged in a flexed region, is also included in the present invention. In addition, the present invention is also effective for the structure disclosed in Japanese Patent Application Laid-Open No. S59-123670, wherein a common slit is used as a discharge portion for plural electrothermal transducers, and for the structure disclosed in Japanese Patent Application Laid-Open No. S59-138461, wherein an opening for absorbing a pressure wave of the thermal energy is formed corresponding to a discharge portion. In other words, according to the present invention, the inkjet ink can be surely discharged in an efficient manner even if the head is of any configuration.

In the image-forming apparatus of the present invention, the present invention is effectively applicable to a so-called full-line type recording head having a length corresponding to the maximum recording width of a recording medium. Such a head may be configured such that a combination of plural heads fill the length or may be configured as an integrally-formed single head.

In addition, the present invention is applicable to a serial type, a head fixed on an apparatus main body, or a replaceable chip type head which is connected electrically with the apparatus main body and can be supplied with the ink when it is mounted in the apparatus main body.

Furthermore, the apparatus of the present invention may further include means for removing liquid droplets. When such means is provided, a more excellent discharging effect can be attained.

It is preferable to add preliminary auxiliary means or the like provided as an arrangement of the apparatus of the present invention since the effects of the present invention can be further stabilized. specific examples of such means include, for the head, capping means, pressurization or suction means, preliminary heating means using electrothermal transducers, another heating element, or a combination thereof, and preliminary discharge means for discharge but not for the discharge of ink.

The most effective technique for the present invention is to carry out the film-boiling system described above.

In the apparatus of the present invention, the amount of ink discharged from each discharge port of the head for discharging the inkjet ink is preferably in the range of 0.1 picoliters to 100 picoliters.

In addition, the ink composition of the present invention can be used in an indirect recording apparatus which applies a recording system of printing ink on an intermediate transfer body and then transferring the ink to a recording medium such as paper. Furthermore, it can be applied to an apparatus that utilizes an intermediate transfer body with a direct, recording system.

Hereinafter, the present invention will be described in detail with reference to examples. However, the present invention is not limited to these examples.

EXAMPLE 1

Figure 2:
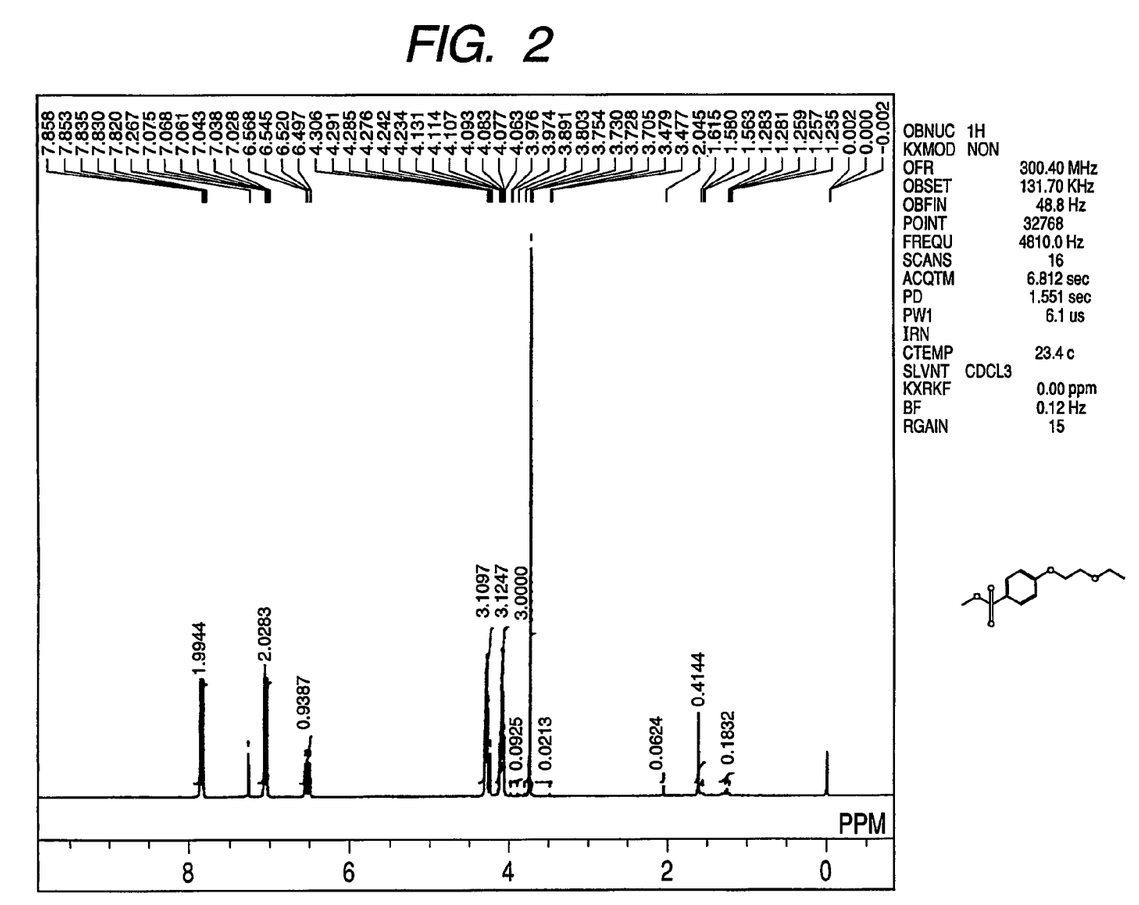
FIG. 2 is a diagram that represents NMR of a polymerizable compound of Example 1 of the present invention.

Synthesis of 21 parts by mass of parahydroxy methyl benzenesulfonate, 8 parts by mass of ethyleneglycol monovinyl ether, 29 parts by mass of triphenyl phosphine, and 11 parts by mass of triethyl amine were cooled to 0° C. in 500 parts by mass of THF. At 5° C. or less, 48 parts by mass of 40% diethyl azodicarboxylate in toluene solution was added therein and then further stirred for 30 minutes. After the temperature rose up to room temperature and the mixture was then stirred for another 30 minutes, 1.5 parts by mass of distilled water was added. Then, the solvent thereof was distilled off and a silica gel column chromatography was conducted to obtain a target polymerizable compound. The NMR of the resulting polymerizable compound is shown in FIG. 2.

EXAMPLE 2

Synthesis of

The target polymerizable compound was obtained by the same method as that of Example 1, except that parahydroxy ethyl benzenesulfonate was used instead of parahydroxy methyl benzenesulfonate.

EXAMPLE 3

Synthesis of Diblock Polymer Consisting of 2-ethoxyethyl vinylether (EOVE: A-Block) and 4-(2-vinyloxy)ethoxy-ethyl benzenesulfonate (VEOEt-PhSO$_3$ Me: B-Block)

The inside of a glass container equipped with a three way stopcock was substituted with nitrogen and then heated at 250° C. under a nitrogen gas atmosphere to remove adsorbed water. After returning the system to room temperature, 10 mmol (milli-mole) of EOVE, 16 mmol of ethyl acetate, 0.1 mmol of 1-isobutoxyethyl acetate, and 11 ml of toluene were added and the reaction system was cooled down. When the inside temperature of the system reached 0° C., a polymerization reaction was initiated by the addition of 0.2 mmol of ethylaluminum sesuqichloride (an equimolar mixture of diethylaluminum chloride and ethylaluminum dichloride). The molecular weight was monitored using a molecular sieve column chromatography (GPC) for time sharing to verify the completion of A-block polymerization. Subsequently, polymerization was continued by raising the temperature up to 20° C. after the addition of 3 mmol of a B-block component (VEOEtPhSo$_3$ Me) in a toluene solution. After 7 hours, the polymerization reaction was completed. The termination of the polymerization was performed by the addition of 0.3% by mass of an ammonium/methanol aqueous solution to the system. The reaction mixture solution was diluted with dichloromethane, washed three times with 0.6 M hydrochloric acid, and then washed three times with distilled water. The resultant organic phase was condensed and dried into a solid by an evaporator. The product dried in a vacuum was repeatedly subjected to a dialysis in a methanol solvent using a cellulose semi-permeable membrane to remove a monomer compound, and a diblock polymer was obtained as a target product. The compound was identified using NMR and GPC, showing Mn=10,900 and Mw/Mn=1.34. The polymerization ratio was A:B=10:3.

Furthermore, the block polymer obtained here was hydrolyzed in a mixture solution of aqueous sodium hydroxide and dimethyl formamide. The B-block component was hydrolyzed, so that a sodium chloride diblock polymer was obtained. The compound was identified using NMR and GPC.

Moreover, a diblock polymer was obtained in which the B-component is converted into free sulfonic acid by neutralization with 0.1 N hydrochloric acid in an aqueous dispersion. The compound was identified using NMR and GPC.

EXAMPLE 4

Lithium chloride diblock polymer was obtained by the same method as that of Example 3, except that aqueous lithium hydroxide was used instead of sodium hydroxide. After the lithium chloride diblock polymer was dispersed in 50 ml of water, disalting treatment was conducted using cellulose semipermeable membrane until pH of water dispersion of lithium chloride diblock polymer came to 8.0 or less. After disalting treatment, water was removed using an evaporator to obtain diblock polymer in which B component came to lithium sulfonate. The compound was identified using NMR and GPC.

EXAMPLE 5

Synthesis of Diblock Polymer Consisting of 4-(2-vinyloxy)ethoxy-toluene (TolOVE: A-BLOCK) and 4-(2-vinyloxy)ethoxy-ethyl benzenesulfonate ((VEOEtPhSO$_3$ Et: B-Block)

The target diblock polymer was obtained by the same method as that of Example 2, except that 4-(2-vinyloxy) ethoxy-toluene (TolOVE) was used instead of EOVE described in Example 2. The diblock polymer compound was identified using NMR and GPC, showing Mn=14,300 and Mw/Mn=1.37 without sodium chlorination. The polymerization ratio was A:B=8:2.

EXAMPLE 6

15 parts by mass of the block polymer obtained in Example 3 and 7 parts by mass of C.I. pigment blue 15:3 were co-dissolved in 150 parts by mass of dimethylformamide and then converted into an aqueous phase using 400 parts by mass of distilled water, resulting in an ink composition. The ink composition was filtrated through a 1.0-µm filter under pressure filtration. There was no agglomerated pigment on the filter. Furthermore, the ink composition which was subjected to filtration under pressure was left standing for 30 days at room temperature. However, C.I. pigment blue 15:3 was not separated and precipitated.

EXAMPLE 7

15 parts by mass of the block polymer obtained in Example 3 and 7 parts by mass of red pigment (CROMOPHTAL JET MAGENTA DMQ PR122; Chiba Specialty Chemicals) were co-dissolved in 150 parts by mass of dimethyl formamide and then converted into an aqueous phase using 400 parts by mass of distilled water, preparing an ink composition in which the red pigment was included in a block polymer dispersing element. The ink composition was filtrated through a 1.0-µm filter under pressure filtration. There was no agglomerated pigment on the filter. Furthermore, the ink composition which was subjected to filtration under pressure was left standing for 30 days at room temperature. However, the red pigment was not separated and precipitated.

EXAMPLE 8

15 parts by mass of the block polymer obtained in Example 3 and 7 parts by mass of yellow pigment (INK JET YELLOW 4G VP2532; Clariant Corp.) were co-dissolved in 150 parts by mass of dimethylformamide and then converted into an aqueous phase using 400 parts by mass of distilled water, preparing an ink composition in which the yellow pigment was included in a block polymer dispersing element. The ink composition was filtrated through a 1.0-µm filter under pressure filtration. There was no agglomerated pigment on the filter. Furthermore, the ink composition which was subjected to filtration under pressure was left standing for 30 days at room temperature. However, the yellow pigment was not separated and precipitated.

EXAMPLE 9

15 parts by mass of the block polymer obtained in Example 3 and 7 parts by mass of black pigment (MOGUL-L; Cabot Corp.) were co-dissolved in 150 parts by mass of dimethylformamide and then converted into an aqueous phase using 400 parts by mass of distilled water, preparing an ink composition. The ink composition was filtrated through a 1.0-µm filter under pressure filtration. There was no agglomerated pigment on the filter. Furthermore, the ink composition which was subjected to filtration under pressure was left standing for 30 days at room temperature. However, the black pigment was not separated and precipitated.

EXAMPLE 10

15 parts by mass of the diblock obtained in Example 45 and 7 parts by mass of Oil Blue N (C.I. Solvent Blue-14, manufactured by Aldrich Co., Ltd.) were co-dissolved in 150 parts by mass of dimethylformamide and then converted into an aqueous phase using 400 parts by mass of distilled water, preparing an ink composition. Oil Blue N was not separated and precipitated after leaving standing for 30 days. From DSC, it was confirmed that the A segment of the diblock polymer used here was a polymer responsive to a temperature stimulation and the occurrence of phase transition was occurred in an aqueous solution at a critical temperature of about 20° C. The A segment was hydrophobic at the critical temperature or more and hydrophilic below that temperature.

When the ink composition obtained in Example 6 was cooled down to 5° C., the dye was phase-separated and achromatized. This implies that the A segment became hydrophilic and the polymer micelle was broken, leading to a possible conclusion that the dye was incorporated in the polymer micelle.

EXAMPLE 11

Ink composition was obtained by the same method as that of Example 10, except that diblock polymer was the diblock polymer obtained in Example 5. Although the obtained ink composition was left standing 30 days, the precipitation of oil blue N was not observed. From the same reason explained in Example 10, when the ink composition was cooled down to 5° C., the dye was phase-separated and achromatized.

COMPARATIVE EXAMPLE 1

15 parts by mass of a diblock polymer consisting of styrene: A-block and 4-vinylbenzoic acid: B-block (polymerization ratio A:B=100:30, Mn=18,850, Mw/Mn=1.42), 7 parts by mass of red pigment (CROMOPHTAL JET MAGENTA DMQ PR122; Chiba Specialty Chemicals) were co-dissolved in 150 parts by mass of dimethylformamide and then converted into an aqueous phase using 400 parts by mass of distilled water, resulting in an ink composition. When the ink composition was filtrated through a 1.0-μm filter under pressure filtration, a slightly-agglomerated pigment was observed on the filter while the filter was clogged. Furthermore, the ink composition which was subjected to filtration under pressure was left standing for 30 days at room temperature. The precipitation of the red pigment was observed.

COMPARATIVE EXAMPLE 2

The ink composition was obtained by the same method as that of Comparative Example 1, except that red pigment was used instead of yellow pigment (INK JET YELLOW 4G VP2532; Clariant Corp.). When the ink composition was filtrated through a 1.0-μm filter under pressure filtration, a slightly-agglomerated pigment was observed on the filter while the filter was clogged. Furthermore, the ink composition which was subjected to filtration under pressure was left standing for 30 days at room temperature. The precipitation of the yellow pigment was observed.

EXAMPLE 12

When recording was performed on normal paper by filling ink tanks of Bubble Jet printer (trade name: BJF800) manufactured by Canon Inc. with the ink compositions prepared in Examples 5 to 11, each color was finely printed.

EXAMPLE 13

The block polymer synthesized in Example 3 was refluxed together with lithium chloride in methanol for 40 hours under heat to covert ester into free sulfonic acid.

EXAMPLE 14

A toner composition was prepared as described below using the free sulfonic acid obtained in Example 11.

100 parts by mass of a polyester resin (synthesized at a molar ratio of bisphenol A, terephthalic acid, n-dodecenyl-succinic acid, trimellitic acid, and diethylene glycol=20:38: 10:5:27), 70 parts by mass of magnetite ($Fe_3O_4$), 2 parts by mass of the free sulfonic acid polymer described above, 2 parts by mass of triphenylmethane dye, and 3 parts by mass of low molecular weight polypropylene were preliminary mixed together, followed by melt-blending by a luder. After cooling it down, it was crushed using a speed mill, then pulverized using a jet mill, and fractioned using a zig-zag classifier, resulting in toner of 11 μm in volume average diameter.

In 100 parts by mass of this toner, 0.4 parts by mass of positive-charged hydrophobic dry silica treated with amino-modified silicon oil (a viscosity of 100 cp at 25° C. and an amine equivalent amount of 800) and 0.2 parts by mass of spherical PVDF particles of 0.2 μm in average particle size were added and mixed by a Henschel mixer, resulting in a positive-charged toner composition. Using this toner composition, printing was performed by a copying machine NP-3525 manufactured by Canon Inc. and fine printing was obtained.

The invention claimed is:

1. A block polymer comprising a repetitive unit structure represented by the formula (2) or (3):

formula (2):

wherein X' represents a polyalkenyl group;

A represents a linear or branched alkylene group having a carbon atom number of 1 to 15 with or without substitution;

m represents an integer from 0 to 30, wherein if m is a plural number, each A is the same or different from each other;

B represents a single bond or an alkylene group with or without substitution;

D represents an aromatic ring structure with or without substitution;

n represents an integer from 0 to 10, wherein if n is a plural number, each D is the same or different from each other; and R represents a hydrogen atom, an alkyl group with or without substitution, or an aromatic ring structure with or without substitution;

formula (3):

wherein X' represents a polyalkenyl group;

A represents a linear or branched alkylene group having a carbon atom number of 1 to 15 with or without substitution;

m represents an integer from 0 to 10, wherein if n is a plural number, each A is the same or different from each other;

B represents a single bond or an alkylene group with or without substitution;

D represents an aromatic ring structure with or without substitution;

n represents an integer from 0 to 30, wherein if m is a plural number, each D is the same or different from each other; and M represents a monovalent or polyvalent metal cation.

2. The block polymer according to claim 1, wherein the block polymer is amphiphatic.

3. A composition comprising:
the block polymer according to claim 1;
a solvent or a dispersing medium; and
a functional substance.

4. The composition according to claim 3, wherein the block polymer includes the functional substance.

5. A recording material comprising:
the block polymer according to claim 1;
a solvent or a dispersing medium; and
a coloring material.

6. The recording material according to claim 5, wherein the coloring material is an organic pigment containing nitrogen atoms.

* * * * *